United States Patent
Kabra et al.

(10) Patent No.: US 11,520,839 B2
(45) Date of Patent: Dec. 6, 2022

(54) USER BASED NETWORK DOCUMENT MODIFICATION

(71) Applicant: International Business Machines Corporation, Armonk, NY (US)

(72) Inventors: Namit Kabra, Hyderabad (IN); Hemant Kumar Sivaswamy, Pune (IN); Vijay Ekambaram, Chennai (IN); Smitkumar Narotambhai Marvaniya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 16/920,845

(22) Filed: Jul. 6, 2020

(65) Prior Publication Data

US 2022/0004585 A1 Jan. 6, 2022

(51) Int. Cl.
*G06F 16/93* (2019.01)
*H04L 67/306* (2022.01)
(Continued)

(52) U.S. Cl.
CPC .......... *G06F 16/93* (2019.01); *G06F 16/1824* (2019.01); *G06F 16/986* (2019.01); *H04L 67/306* (2013.01)

(58) Field of Classification Search
CPC .... G06F 16/93; G06F 16/1824; G06F 16/986; H04L 67/306
(Continued)

(56) References Cited

U.S. PATENT DOCUMENTS 7,818,329 B2    10/2010   Campbell et al.
2005/0160065 A1*  7/2005  Seeman ............... G06F 16/957
(Continued)

FOREIGN PATENT DOCUMENTS

CA    3028313 A1 *  7/2019  ............ G06F 16/93
JP    09204418 A  *  8/1997
(Continued)

OTHER PUBLICATIONS

Waddilove, Roland. "Get Word Definitions with a Web Browser Dictionary Add-On." RAW Computing, May 19, 2019, www.rawinfopages.com/tips/2014/03/get-dictionary-definitions-in-your-browser. (Year: 2019).*

(Continued)

*Primary Examiner* — Stephen S Hong
*Assistant Examiner* — Broderick C Anderson
(74) *Attorney, Agent, or Firm* — Eric Chesley (57) ABSTRACT

A first user access, directed to a first network document, of a first user is detected. One or more first network document concepts in the first network document are detected. A first user profile of the first user is retrieved based on the first user access. A first knowledge gap of the first user is identified based on the first network document concepts and based on the first user profile. One or more additional network documents are obtained based on the one or more first network document concepts. The additional network documents include at least a first concept of the one or more first network document concepts. The first network document is modified to include at least a portion of the first concept from the one or more additional network documents. The modification is based on the first knowledge gap and on the one or more additional network documents.

20 Claims, 5 Drawing Sheets

(51) Int. Cl.
*G06F 16/958* (2019.01)
*G06F 16/182* (2019.01)

(58) Field of Classification Search
USPC .......................................................... 707/608
See application file for complete search history.

(56) References Cited

U.S. PATENT DOCUMENTS

| | | |
|---|---|---|
| 2006/0074980 A1 | 4/2006 | Sarkar |
| 2008/0306925 A1 | 12/2008 | Campbell et al. |
| 2011/0082848 A1 | 4/2011 | Goldentouch |
| 2014/0372876 A1 | 12/2014 | Bliss et al. |
| 2015/0205768 A1 | 7/2015 | Fernadez-Ruiz |
| 2016/0357713 A1 | 12/2016 | Tochini et al. |
| 2017/0024403 A1 | 1/2017 | Tocchini et al. |
| 2017/0024404 A1 | 1/2017 | Tocchini et al. |
| 2017/0308792 A1* | 10/2017 | Liang ..................... G06Q 10/02 |
| 2018/0357220 A1 | 12/2018 | Galitsky |
| 2018/0357221 A1 | 12/2018 | Galisky |
| 2021/0150927 A1* | 5/2021 | Monos ..................... G06N 5/04 |

FOREIGN PATENT DOCUMENTS

| | | | |
|---|---|---|---|
| KR | 101465668 B1 | 11/2014 | |
| WO | WO-2014048479 A1 * | 4/2014 | ......... G06F 17/2765 |
| WO | 2017041187 A1 | 3/2017 | |

OTHER PUBLICATIONS

"What is Haystack," W3C Technology and Society domain, Printed: Apr. 9, 2020, 1 page. https://www.w3.org/2005/04/swls/BioDash/Demo/What%20is%20Haystack.html.

Mell et al., "The NIST Definition of Cloud Computing", Recommendations of the National Institute of Standards and Technology, Special Publication 800-145, Sep. 2011, 7 pages.

* cited by examiner

USER BASED NETWORK DOCUMENT MODIFICATION

BACKGROUND

The present disclosure relates to network documents, and more specifically, to modifying network documents dynamically based on the user consuming the network document.

Network documents, such as Internet blogs, may include content of various lengths. The content may include the description or discussion of various topics. Users may seek to consume the network documents. Unfortunately, users may be prevented from consuming the network documents due to a knowledge gap or a lack of knowledge about only a portion of the network documents.

SUMMARY

According to embodiments, disclosed are a method, system, and computer program product.

A first user access of a first user is detected. The first user access is directed to a first network document. One or more first network document concepts in the first network document are detected based on the first network document. A first user profile of the first user is retrieved based on the first user access. A first knowledge gap of the first user is identified. The identification is based on the first network document concepts and based on the first user profile. One or more additional network documents are obtained based on the one or more first network document concepts. The additional network documents include at least a first concept of the one or more first network document concepts. The first network document is modified to include at least a portion of the first concept from the one or more additional network documents. The modification is based on the first knowledge gap and on the one or more additional network documents.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to network documents; more particular aspects relate to modifying network documents dynamically based on the user consuming the network document. While the present disclosure is not necessarily limited to such applications, various aspects of the disclosure may be appreciated through a discussion of various examples using this context.

Network documents are becoming a source of reliance for users at an increasing rate. Network documents may include Internet blogs, social media posts, forum threads and posts, video blogs, audio podcasts, and other accessible media containing topics of various lengths. Network documents may include content of various modalities (e.g., text, video, audio clips) that covers various concepts or topics (e.g., short text posts accompanied with an animation). One of the challenges that reduces the usability of network documents and causes the documents to lower in value is that sometimes a subset of the concepts is above the skill or knowledge of a user. For example, a user may have a skill/knowledge gap over a subset of the topics or concepts that are contained in a network document.

One way that certain blogs and other network documents may attempt to help with user knowledge gaps is by linking or providing a shortcut to other documents for each of the concepts that are discussed in a given network document. Another way that certain blogs or network documents may attempt to close a knowledge gap of a user is by editing the network documents before they are read by users. For example, a network document may be edited by adding additional information to explain various concepts and topics of the network document. Augmenting a network document, however, may be an arduous and user-resource intensive process, e.g., a person has to go and find information for each concept or topic and provide the relevant additional explanatory information. To overcome this, in some cases, a computer may be employed to statically link or augment a network document, so that all the concepts are explained with additional information.

Static linking or augmented text can lead to a few drawbacks, however. One issue with providing shortcuts to other documents for all topics, is that of clutter and confusion. For example, a network document may discuss or mention dozens of different concepts, and each concept may be linked to additional documents that explain each concept. This extraneous amount of information may lead to confusion for a user, as a user may become overwhelmed with the breadth of topics. The extraneous amount of information may also lead to distraction; as a user goes to a particular other linked document and is again provided with many more options than are helpful or necessary for the user to understand the concepts of a network document. Another issue is that of length and time wasting. As certain topics are designed to be digestible in a certain amount of time, or to take up a certain amount of space (e.g., a blog post, a news story), adding in additional information to explain various concepts may hamper readability. For example, a network document that has been increased significantly in size with other information, may no longer be consumable in a relatively short amount of time. To compensate, a user may even attempt to skim portions of the network document and statically augmented information. Skimming, by users, may lead to concepts or topics that were the focus of the unaltered network document, to be accidentally skipped. Consequently, users may not fully understand or may be discouraged from consuming the network document.

Another issue with providing shortcuts to each topic of a network document is that each user may have a different skill or understanding. For example, an example set of users (including an expert user and a novice user) may wish to access a blog post regarding "machine learning" or "neural networking" that may discuss a particular subset of concepts. The blog post may have a series of links or shortcuts to other documents that explain some of the subset of concepts. An expert user may understand almost every concept that is linked to other documents of the blog post. The expert user may find all of the links or other extraneous information distracting and may find that use of the blog may suffer with all of the extraneous information. Conversely, a novice user who does not have an advanced knowledge regarding the particular concepts may be unable to comprehend the blog post. The novice user may be unable to view or understand the concepts or may suffer as the novice user may have to open additional web browsing windows or tabs or consult many reference materials as not every concept that the novice user does not understand is linked. Further, the novice user may also suffer as the novice user may seek to understand concepts and may find other documents that are not relevant or may mistakenly select other documents.

Another issue with network documents that are statically augmented with additional information is that the format of augmentation may be rigid and not tailored to a learning style, device, or preference of a user. For example, certain blog posts may include additional information in the form of hyperlinks that direct users to other pages. This may slow down the ability of a user to use certain devices, such as a smartphone with small screens. In other instances, a user may prefer to separate concepts into different tabs or windows so that they may focus on a first window while using a desktop computer or a portable computer, but a static augmentation may put the information inline into a network document reducing a user's organization and comprehension. In yet another instance, a user may learn well by listening to a short audio snippet, and the static augmentation of information may be in the form of additional text to read. This static form of augmentation may help certain users, but hinder other users, due to the variance of learning styles, preferences, and device form factors.

Dynamic document enrichment (DDE) may overcome the limitations of other forms of adding information to network documents. The DDE may operate by automatically identifying the fundamental requirements for a network document. The DDE may also figure out similar network documents that have the same (or a similar) style and context which could address the fundamental requirements. Based on a per-user basis, the DDE may augment, enhance, enrich, or otherwise alter a network document. The alteration or modification may be to include only information that alleviates a knowledge gap of the user. For example, any additional information that is identified as extraneous, or is not knowledge unknown to a user, may not be used for alteration of a network document.

The DDE may identify other network documents that are of a similar length to alter a first network document. The similar length may alleviate comprehension and time uses as the overall reading time may scale or closely match or the first network document. The DDE may only select or identify other network documents that are shorter in length to a first network document. The DDE may only select additional other network documents based on a predetermined threshold. For example, a DDE may determine an initial length of a network document is 300 words length. Based on a predetermined threshold of 1.2, the DDE may select only documents that are 360 words or less. In some embodiments, the predetermined threshold may be 0.7 or another value less than one (e.g., 0.85, 0.7, 0.99). For example, based on a network document of 220 words, and a 0.9 predetermined threshold, only documents of 198 words may be selected for augmenting the network document. Other documents that are greater than the predetermined threshold may not be selected, or may be filtered out, or may be removed from consideration. For example, given a predetermined threshold of point 0.8 and a network document of an Internet video clip of 400 seconds, any video clip that is longer than 320 seconds may not be selected.

The DDE determines a knowledge gap on a per-user basis. The determination of the knowledge gap may be based on scoring a user. The determination of the knowledge gap may be based on performing a question and answer session with a user. The question and answer session may include determining the minimal set of questions to ask the user. The determination of the knowledge gap may be based on detecting the gaze of the user.

The determination of the knowledge gap may be based on a user profile of a user. A user profile may contain historical information of the user. For example, a user profile of a given user may include the browsing history of various websites of the user collected by a daemon, web browser plug-in, or other tool running on a computing device of the user. The user profile may contain information about demographics of the user (e.g., age, cultural information, level of education, job title).

The user profile may contain information about a style or modality of information that a user prefers to access. For example, the user profile of a first user may indicate that the user prefers to consume news information in the form of graphs and charts. Further, the user profile of the first user may indicate that the user prefers to consume technology information in the form of video and audio clips, and that the user prefers to consume scientific information in the form of text, equations, and information. Continuing the example, a second user may have preferences that indicates the second user prefers to consume most media in the form of text but prefers to consume news in the form of audio clips. The DDE may retrieve and filter the additional information from other network documents based on the user profiles such that each user has a customized version of a network document that is tailored to their modality. For example, a first user may have a blog post augmented with a short definition for a concept, while a second user may have the same blog post augmented with a twenty second video clip for the same concept.

Figure 1:
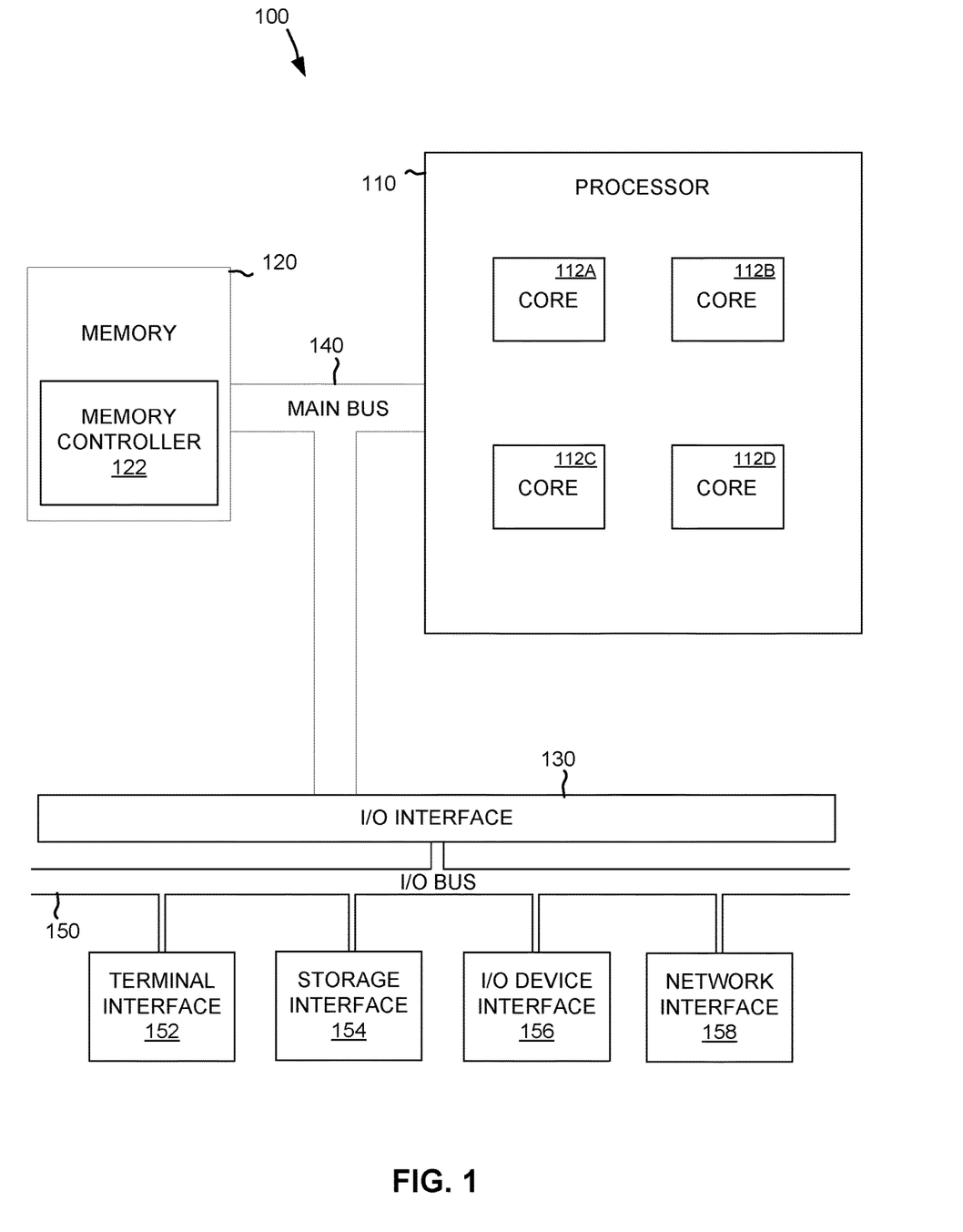
FIG. 1 depicts the representative major components of an example computer system that may be used, in accordance with some embodiments of the present disclosure.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
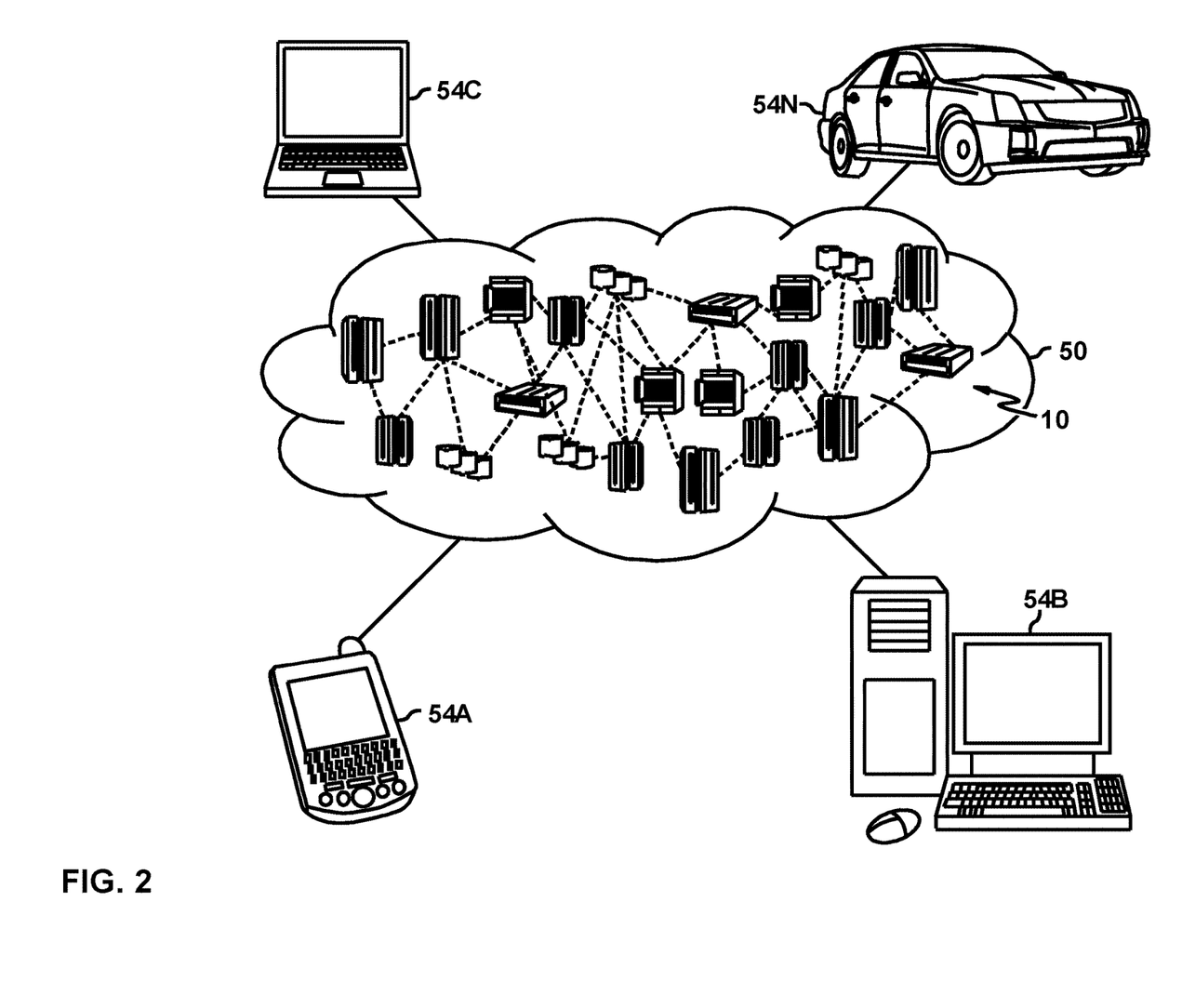
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
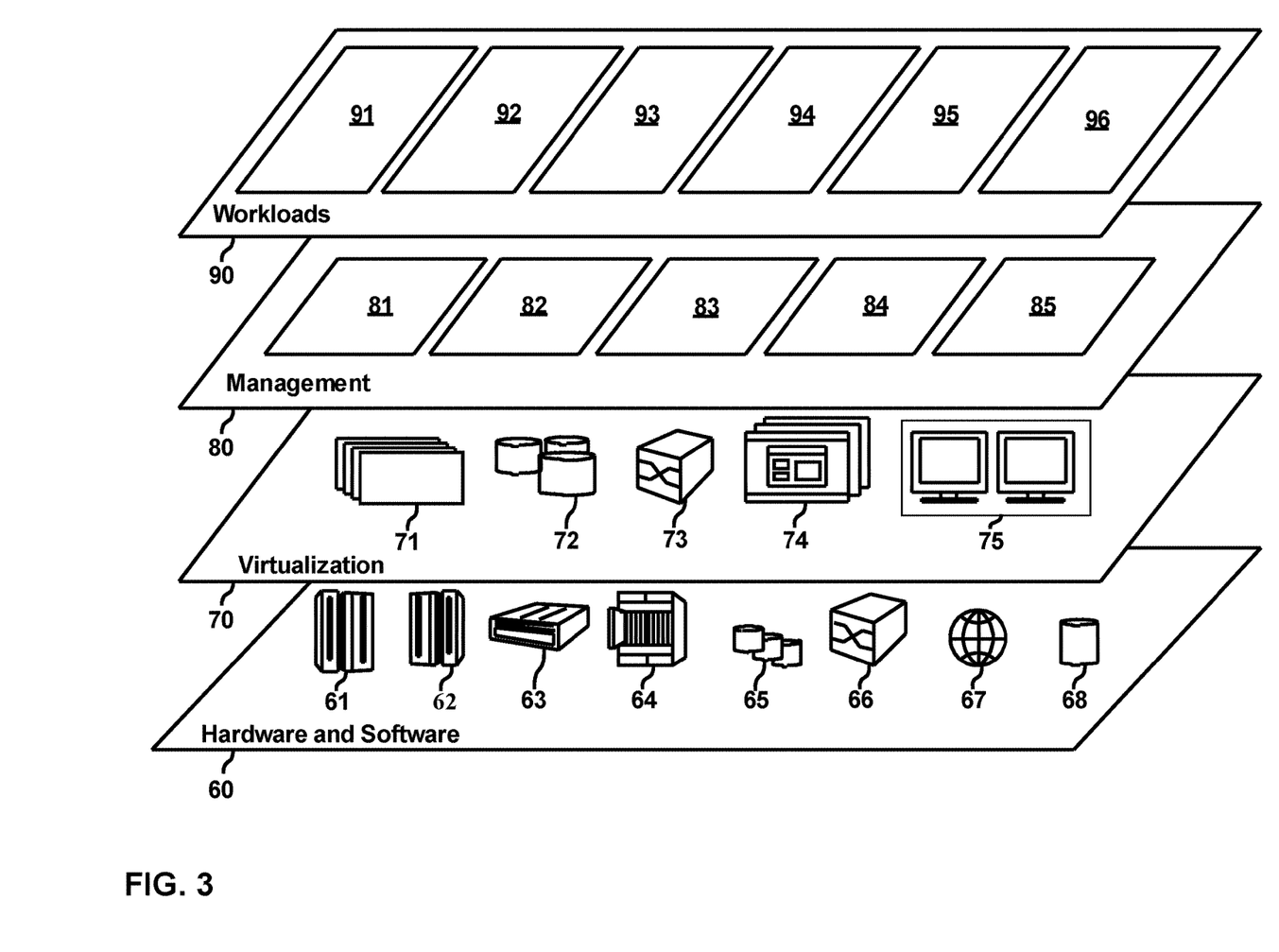
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic document enrichment of network documents 96.

Figure 4:
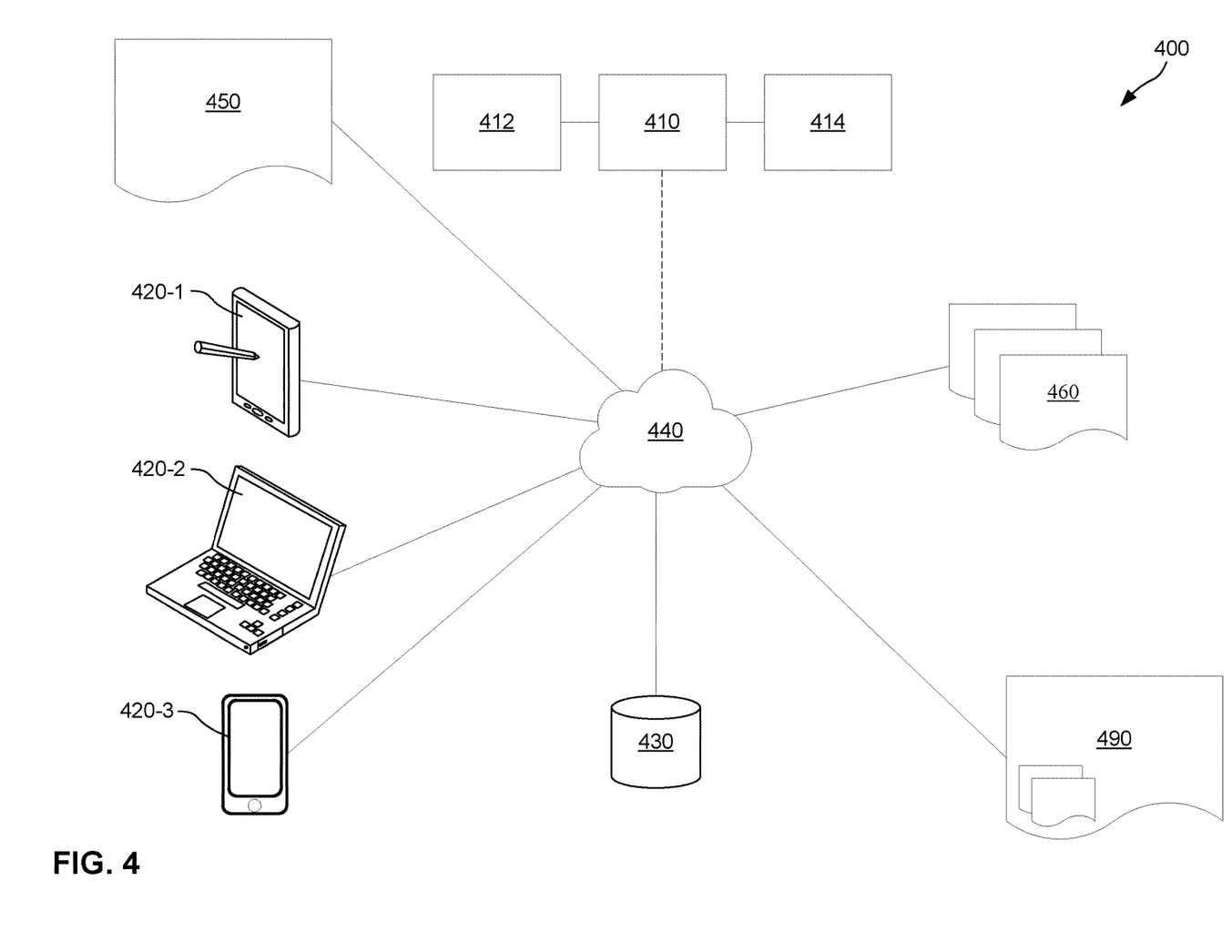
FIG. 4 depicts an example system of dynamic document enrichment (DDE), consistent with some embodiments of the disclosure.

FIG. 4 depicts an example system 400 of DDE, consistent with some embodiments of the disclosure. System 400 may include the following components: a DDE engine 410 configured to contextualize and mine the context of network documents; one or more user devices 420-1, 420-2, 420-3 (collectively, 420), which may include some or all of the features of the computer system 100 for user consumption of network documents; a user profile datastore 430 configured to store one or more user profiles corresponding to various users; and a network 440 for communicatively coupling the various components.

The DDE engine 410 may operate on a computer, such as computer system 100. In some embodiments, the DDE engine 410 may operate on a cloud, such as cloud computing environment 50. In some embodiments, some or all of the components of the DDE engine 410 may be configured to operate in whole or in part on the user devices 420. In a first example, the DDE engine 410 may communicate from a server to a daemon, job, browser plugin (or other relevant technology) operating on a smartphone app located on user device 420-3. In a second example, the DDE engine 410 may be configured to operate entirely on user device 420-2.

The DDE engine 410 may operate based on a user accessing one or more network documents. For example, the DDE engine 410 may monitor a user accessing an internet blog post 450 through one of the user devices 420. In response, to user accessing the post 450, the DDE engine 410 may detect the user access of the content of the post 450. The post 450 may include one or more content elements, topics, or subjects. For example, the post 450 may be about image editing, and it may include topics about aliasing, chroma, resolution, scaling, bit depth, among other concepts. The DDE engine 410 may determine that the network document 450 is directed to a particular general concept by matching the occurrence of related topics to a concept-based dictionary or other relevant concept structure. The concept-based dictionary may rank, connect, score, or otherwise relate a given topic to other topics. For example, given a first concept identified as image editing, another concept of circuit impedance may be less related than another concept of resolution scaling in the concept-based dictionary.

The DDE engine 410 may analyze the post 450 to determine the concepts contained in the post. The DDE engine 410 may utilize a natural language processing (NLP) system 412. In some embodiments, the NLP system 412 may include various components' (not depicted) operation through hardware, software, or in some combination—for example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from network 440, such as other network documents 460—for example, other various blog posts that share concepts with blog post 450. Various components (not depicted) of the natural language processor may include, but are not limited to, a tokenizer, a part-of-speech (POS) tagger, a semantic relationship identifier, and a syntactic relationship identifier. The natural language process may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., a series of explanations and conceptual connections form on a first article of the other network documents 460 may be connected or explained in a second article of the other network documents 460). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a network document 450 for analysis at the natural language processing system 412, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

The DDE engine 410 may leverage an image processor 414. The image processor 414 may be a collection of hardware and software, such as an application specific integrated circuit.

The image processor 414 may be configured to perform various image analysis techniques (IAT). The image analysis techniques may be machine learning-based and/or deep learning-based techniques. These IAT may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor 414 may be configured to aid the DDE engine 410 in identifying concepts in a given network document 450 (e.g., network document 450 may be an image or video accessed by a user, and image processor 414 may identify one or more concepts, subjects, topics, and the like depicted in the network document 450 using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a network video may be analyzed. Using a relevant object detection algorithm, a concept of a healthcare topic in the network video may be identified.

In some embodiments, features of the objects of concepts in a network document 450 may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model. For example, if a user snaps an image of their vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a network document provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., a capacitor of 0.5 cm in diameter in a network document 450 that is a video on electronic circuit design), colors of object, and/or other attributes of objects. In some embodiments, the output may generate a list including the identity and/or characteristics of objects (e.g., cotton shirt, metal glasses, etc.). In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the object, metadata, or information regarding the surrounding of the object that may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person in the same video, pixel-count of a first microprocessor and pixel-count of a second microprocessor in the same image), relationships with other objects (e.g., an eye belongs to a face), or objects belonging to the same class (e.g., two bolt-heads are metric sized).

The DDE engine 410 may determine the fundamental requirements for a given network document of a user. For example, if a network document 450 discusses circuit design, the DDE engine 410 may scan the document for various concepts that relate to circuit design, such as solder selection, current draw, and the like. Given a network document 450, the DDE engine 410 may identify the basic concepts repeated in the given network document (e.g., using NLP or IAT). The DDE engine 410 may then filter out any repeated instances of a previously identified concept in the network document 450. The DDE engine 410 may further filter out or reduce the importance of concepts that include more detail or are explained at further length in the given network document 450.

Next the DDE engine 410 may obtain other network documents 460 that include similar concepts to the concepts that are determined in the network document 450. For example, the DDE engine 410 may obtain other documents 460 by performing a search using a relevant technique—using NLP, IAT, keyword matching, or another concept detection algorithm. The search may be performed by the DDE engine 410 directly. In some embodiments, the search may be performed indirectly (by an instruction from the DDE engine 410), by a daemon, job, web crawler, or other relevant document search technology (e.g., an Internet web crawler).

The DDE engine 410 may operate based solely on the concepts determined in the network document 450 to obtain one or more of the other documents 460. In some embodiments, the DDE engine 410 may operate based on the concepts determined in the network document 450 and on a nexus of the one or more other documents 460. For example, in a first search, the DDE engine 410 may perform a determination of the concepts on the entirety of other network documents 460 to identify a nexus, or set of concepts that are in a majority or a predetermined threshold of the documents (e.g., 25% of the other documents 460). Next, in a second search, the DDE engine 410 may then pull from only one or more other network documents 460 that are in the identified nexus. Further, the DDE engine 410 may identify similar other network documents 460 having the same style and context which could address the fundamental requirements of the network document 450 and also conform to the user preferences in the user profile datastore 430.

The DDE engine 410 may identify, based on the search and also based on a profile of the user, stored in the profile datastore 430, a knowledge gap of the user. For example, a profile of the user may store or include demographic information about the user, such as the age, experience, education, job role/position/title, and the like. The profile of the user may also include a non-exhaustive list of topics, concepts, and keyword-based learning experience the user has (e.g., keywords for machine learning, sub-topics about particular phases of circuit design, concepts of knowledge that relate to image editing). The profile of the user may also include a browsing history of the user (e.g., previous network documents that a web-browser of the user device 420 has accessed, previous network documents that a pod-cast player or audio-visual streaming client of the user device 420 has accessed). The profile of the user may also include one or more style and context preferences (e.g., a first user profile may indicate only a preference for enrichment in the form of other blogs, theory, numbers, equations, and figures; a second user profile may indicate a preference for videos, drawings, conversation snippets between multiple parties, and animations). The style and context preferences of a user profile may also include information about the length of preferred enrichment (e.g., a first user may only prefer enrichments to a network document that increase the length by 10%, a second user may have a preferred enrichment to a given network document that no more than doubles the length). The style and context preferences of a user profile may also include device specific concept enrichment preferences (e.g., a first user may only prefer animation enrichments on a tablet device, the first user may only prefer additional textual enrichment on a laptop or desktop personal computer device, a second user may prefer auditory enrichment only on a smartphone device, a third user may prefer hyperlinks for a personal computer and inline-text insertion for a tablet).

The DDE engine 410 may identify a knowledge gap of the user. In some embodiments, the knowledge gap may be based on the gaze of a user. For example, a camera attached to one of the user devices 420 may track the eye movement of the user. Based on the eye movement, the DDE engine 410, may detect that the user is gazing at a particular, word, phrase, acronym, object in an image, or other representation of a concept. The DDE engine 410, may use the detected representation of the concept and also the one or more detected concepts.

In some embodiments, the DDE engine 410 may identify a knowledge gap of the user based on a question-answer session. For example, the DDE engine 410 may detect that a given network document 450 discusses four concepts. The DDE engine 410 may access the user profile and identify, based on the profile, that the user does not understand the second concept and the third concept. The DDE engine 410 may not be able to determine a knowledge gap based on the profile of the user (e.g., the profile stored in the user profile database 430 is silent regarding one or more of the concepts that are determined in the network document 450). The DDE engine 410 may prompt the user to answer about knowledge or understanding of the second concept and the third concept. The question-answer session may be in the form of a messaging session (e.g., a text message, a secure messaging system (SMS) message). The number and content of the question-answer session may be based on the network document, the other network documents, or both. The question-answer session, for example, may be prompted based on the number of identified concepts, such as if greater than four or ten concepts are determined in the network document. In another example, the question-answer session may be prompted if a given network document contains only two concepts, but an identified nexus of thirteen other concepts that relate to the two concepts are discovered in a set of other network documents.

The DDE engine 410 may modify the network document 450 to create a modified network document 490 for the user to consume. The modified network document 490 may be modified individually for each user of the system 400. In a first example, a first user may have a user profile stored in the user profile datastore 430 that includes preferences that indicate only an increase in size of 30% for all network documents, and to only include enrichments for concepts that relate to machine learning. In the situation that the network document 450 is related to machine learning, one or more concepts may be determined, and a knowledge gap of the user may also be identified, enrich the document with additional text, videos, and the like. In the situation that the network document 450 is related to painting, the network document may not be altered. In a second example, a second user may have a user profile stored in the user profile datastore 430 that includes preferences that indicate that enrichment should take place for all topics, but that only additional text should be added based on the user using the smartphone 420-3, but that hyperlinks to additional videos and text should be added based on the user using the personal computer 420-2. In the situation that the second user is using user device 420-3, the DDE engine 410 may enrich determined concepts by including additional text. In the situation that the second user is using device 420-2, the DDE engine 410 may enrich determined concepts by including hyperlinks to videos and textual blogs on the determined concepts.

Figure 5:
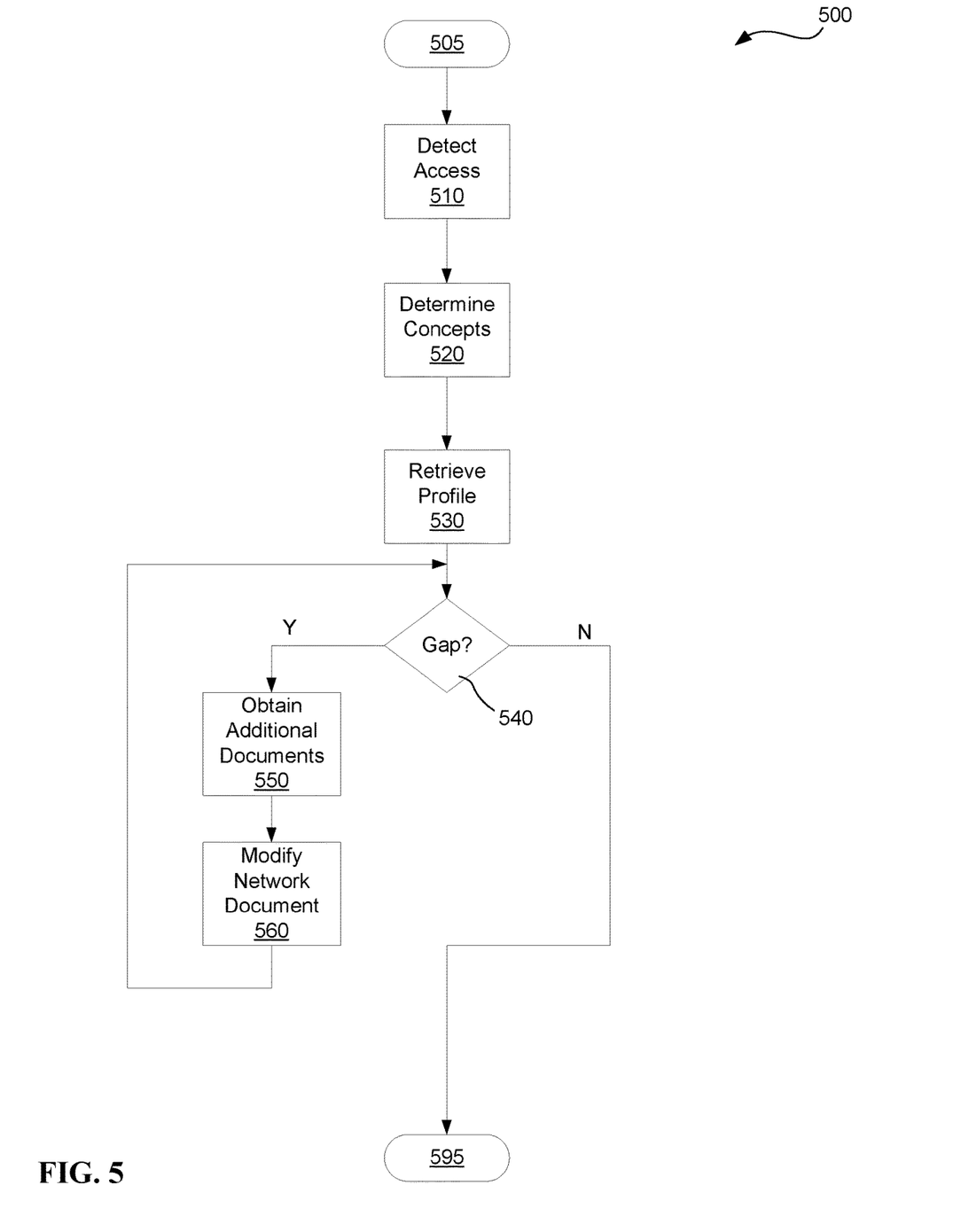
FIG. 5 depicts an example method of DDE, consistent with some embodiments of the disclosure.

FIG. 5 depicts an example method 500 of DDE, consistent with some embodiments of the disclosure. Method 500 may be performed by a computer system, such as computer 100. Method 500 may be performed by a cloud service, such as cloud computing environment 50. Method 500 may be performed by a DDE engine, such as DDE engine 410. Method 500 may operate on a user device of a user, as a user performing browsing, watching, viewing, listening, or otherwise accessing of network documents on a user device, such as one or more of user devices 420.

From start 505, an access of a network document may be detected at 510. The detection of access of a given network document may be performed directly by a computer system, or DDE engine, such as DDE engine 410. The access of a given network document may be detected indirectly. For example, by monitoring through a browser plugin of a web-browser running on a user device, the webpages or other uniform resource locations.

Based on detecting a particular network document, one or more concepts of the detected network document may be determined at 520. Determination of the one or more concepts may be based on NLP, IAT, or another relevant audio, text, image, or video analysis. Determining of the one or more concepts may include performing, sorting, ranking or scoring the concepts.

At 530, a profile of the user may be retrieved. The profile of the user may be retrieved from a datastore, such as a flat file, database, or other relevant data structure. For example, a user profile may be retrieved from datastore 430. The profile may contain preferences regarding the context of preferred enrichment (e.g., a preference for enrichment based on a user device of the user). The profile may contain preferences regarding a writing style of a user. The profile may contain history of a user (e.g., past enrichments, existing topics of user familiarity). In some embodiments, a user may not have an existing profile, and at 530 a profile of the user may be created. Creation of the profile may include prompting, through a question-answer session or a dialog for certain information and experience of the user. The profile may contain demographic information of a user (e.g., age, occupation, educational experience).

A gap may be identified in the knowledge of a user at 540. The knowledge gap may be based on the concepts or the network document that was accessed by the user. For example, the user may have accessed a network document that covers the topic of plumbing, and based on the user never accessing a network document regarding plumbing before, method 500 may identify a knowledge gap in plumbing on the various concepts of water flow rates and wrench usage mentioned in the network document. The knowledge gap may be based on a profile of the user that was retrieved. For example, a retrieved profile may include preferences for the enrichment of network documents that are related to color and contrast, and the network document accessed by the user may be a discussion of chroma and luminance signals in analog television signals. The knowledge gap may be identified based on a combination of the network document and the user profile.

In some embodiments, the knowledge gap may be identified based on scoring the user. For example, a network document accessed by a user may be directed towards machine learning. The network document may be scanned and particular concepts, words, phrases, acronyms, images, equations and the like may be determined. The concepts may be further determined by performing a preliminary search for other documents that include concepts, definitions, examples, and other various styles of content. The detected concepts are extracted from the other documents and an annotated list is created for further comparison against the concepts of the network document. Various other usage and scores (retrieved from other user profiles stored in a datastore) are used to score the various concepts based on the network document, and the knowledge gaps of other similar profiles that have accessed the network document or accessed the other documents. Upon detecting that the user may not understand a particular concept (e.g., detection of gaze, detection of scrolling or viewing a particular portion of a scrolling document, and the like), the knowledge gap for a particular concept of the network document may be identified. Based on the length of time of the gaze of the user—or based on the commonality of other users that also gaze or view the particular concept—the user may be identified as having a knowledge gap and assigned a score. The score may indicate that a user has a complete lack of knowledge, or a partial lack of knowledge, or that a user has no lack of knowledge of a concept. For example, if a user pauses on a particular concept for only a few seconds, then a user may be scored has having a knowledge gap of "1" on a scale of "1-10" where "1" is no gap, and "10" is a complete gap. If the user gazes or views a first concept for more than five seconds but less than thirty seconds, the knowledge gap may be scored as "4" for the second concept.

The identification of a knowledge gap, at 540, may be repeated for every concept that is determined in the network document. If a knowledge gap is identified, at 540:Y, one or more additional network documents may be obtained at 550. The additional network documents may be obtained by a DDE, such as DDE engine 410 of FIG. 4. The additional network documents may be based on the concepts that were determined (at 520). For example, similar network documents may be identified based on performing a network search (e.g., crawling the Internet for blogs posts and images that address the concepts). As the additional network documents are obtained, they may be tagged for various, content, context, style, or other modalities. For example, of the set of obtained additional network documents, those that contain text may be scanned using a NLP technique and tagged based on the context, style, and demographic information.

The additional network documents may be obtained based on a user profile of the user. The profile may contain information in the form of tags that express a preference for or a preference against certain form, modality, context, or demographic information. The tags may be compared to the obtained additional network documents to only perform enrichment based on a subset of the additional network documents: in a first example, only retrieving documents that match a context or modality preference of the user profile of the user; in a second example, only retrieving documents that are of an age, employment focus, or other demographic of the user. Additional network documents may not be retrieved or de-emphasized if they do not match a preference of the user profile. For example, a document that is written in a lengthy research format may be ignored based on a preference for business-style writing. In another example, results that include posts in a conversational style with a certain age rating may be placed before, or given a higher rating, or may be retrieved before other documents. In yet another example, certain additional network documents may be initially retrieved, but may be later filtered out of the obtained set of additional network documents if they are in a video format and a user preference is for textual documents.

The network document that was accessed by the user may be modified at 560. The modification of the network document may be based on the knowledge gap of a user that was previously identified. The content of the modification may include the concepts that were covered in the obtained additional network documents. The modification may include a formatting of the additional network documents. For example, certain text may be selected from the additional network documents that covers the concepts of the identified knowledge gap. Other text from the selected additional network documents may be discarded. The formatting of the additional network documents may also be based on the user profile of the user. For example, the user profile may indicate a preference for the use of bold, italics, or frequency of use of equations, acronyms, abbreviations and the like. The content of the additional network documents may be formatted to remove or add the various bold, italics, equations, acronyms, and the like.

In some embodiments, a machine learning technique may be used to modify the network document. For example, learning techniques may be employed to joint embed a synthesized form of multiple similar additional network documents' content. The synthesized form may take into consideration the preferences and demographic information of stored in a user profile of the user. Through machine learning techniques, the synthesized form may include a portion of a first additional network document and a portion of a second additional network document. In some embodiments, a generative adversarial network (GAN) based neural network technique may be used to generate the network document enrichment. For example, a plurality of network document enrichments may be generated by a first neural network from the obtained additional network documents. The plurality of network document enrichments may be quite numerous, e.g., dozens, hundreds, or thousands of generated additional network document enrichments. Further, a second neural network may rate or score the generated additional network document enrichments based on a particular value (e.g., accuracy, conciseness, modality adherence, length). Based on the second neural network scoring, a given generated additional network document enrichment may result in a score higher than any of the other generated additional document enrichments, the given generated additional network document enrichment may be selected for use in modification of the network document.

After the network document is modified for a given identified skill gap at 560, method 500 continues to identify additional knowledge gaps at 540. If no other knowledge gaps are identified at 540:N, method 500 ends at 595.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a first user access of a first user, the first user access directed to a first network document;
   determining, based on the first network document, one or more first network document concepts in the first network document;
   retrieving, based on the first user access, a first user profile of the first user;

assigning a knowledge gap score to the first user based on a first concept in the one or more first network document concepts and further based on the first user profile, wherein the knowledge gap score indicates a first knowledge gap of the first user with respect to the first concept in the one or more first network document concepts;

obtaining, based on the first knowledge gap score and the one or more first network document concepts, one or more additional network documents, the additional network documents include at least the first concept in the one or more first network document concepts; and modifying, based on the first knowledge gap and based on the one or more additional network documents, the first network document to include at least a portion of the first concept from the one or more additional network documents.

2. The method of claim 1, wherein the method further comprises:

formatting, before the modifying of the first network document, the one or more additional network documents.

3. The method of claim 2, wherein the formatting is based on the first network document.

4. The method of claim 2, wherein the formatting is based on the first user profile of the first user.

5. The method of claim 1, wherein the method further comprises:

obtaining, based on the one or more first network document concepts, one or more second additional network documents, the second additional network documents includes at least a second concept of the one or more first network document concepts; and modifying, based on the first knowledge gap and based on the one or more additional network documents, the first network document to include at least a portion of the second concept from the one or more second additional network documents.

6. The method of claim 1, wherein the method further comprises:

detecting a second user access of the first user, the second user access directed to a second network document;

determining, based on the second network document, one or more second network document concepts in the second network document;

identifying, based on the second network document and further based on the first user profile, a second knowledge gap of the first user;

obtaining, based on the one or more second network document concepts, one or more second additional network documents, the second additional network documents include at least a second concept of the one or more second network document concepts; and modifying, based on the second knowledge gap and based on the one or more second additional network documents, the second network document to include at least a portion of the second concept from the one or more second additional network documents.

7. The method of claim 1, wherein the method further comprises:

detecting a second user access of a second user, the second user access directed to the first network document;

retrieving, and based on the second user access, a second user profile of the second user; and identifying, and based on the one or more first network document concepts and further based on the second user profile, a second knowledge gap of the second user.

8. The method of claim 7, wherein the method further comprises:

obtaining, based on the one or more first network document concepts, the one or more additional network documents, the additional network documents include at least a second concept of the one or more first network document concepts; and modifying, based on the second knowledge gap and based on the one or more additional network documents, the first network document to include at least a portion of the second concept from the one or more additional network documents.

9. The method of claim 7, wherein the method further comprises:

obtaining, based on the one or more first network document concepts, the one or more additional network documents, the additional network documents include at least the first concept of the one or more first network document concepts; and modifying, based on the second knowledge gap and based on the one or more additional network documents, the first network document to include at least a portion of the first concept from the one or more additional network documents.

10. The method of claim 1, wherein the first user profile is based on one or more demographics of the first user.

11. The method of claim 1, wherein the first knowledge gap score is calculated based on asking the first user one or more questions.

12. The method of claim 1, wherein the first knowledge gap score is based on determining a gaze of the first user.

13. A system, the system comprising:

a memory, the memory containing one or more instructions; and a processor, the processor communicatively coupled to the memory, the processor, in response to reading the one or more instructions, configured to:

detect, a first user access of a first user, the first user access directed to a first network document;

determine, based on the first network document, one or more first network document concepts in the first network document;

retrieve, based on the first user access, a first user profile of the first user;

assign a knowledge gap score to the first user based on a first concept in the one or more first network document concepts and further based on the first user profile, wherein the knowledge gap score indicates a first knowledge gap of the first user with respect to the first concept in the one or more first network document concepts;

obtain, based on the first knowledge gap score and the one or more first network document concepts, one or more additional network documents, the additional network documents include at least the first concept in the one or more first network document concepts; and modify, based on the first knowledge gap and based on the one or more additional network documents, the first network document to include at least a portion of the first concept from the one or more additional network documents.

14. The system of claim 13, wherein the processor is further configured to:
   format, before the modifying of the first network document, the one or more additional network documents.

15. The system of claim 14, wherein the format is based on the first network document.

16. The system of claim 14, wherein the format is based on the first user profile of the first user.

17. A computer program product, the computer program product comprising:
   one or more computer readable storage media; and
   program instructions collectively stored on the one or more computer readable storage media, the program instructions configured to:
     detect a first user access of a first user, the first user access directed to a first network document;
     determine, based on the first network document, one or more first network document concepts in the first network document;
     retrieve, based on the first user access, a first user profile of the first user;
     assign a knowledge gap score to the first user based on a first concept in the one or more first network document concepts and further based on the first user profile, wherein the knowledge gap score indicates a first knowledge gap of the first user with respect to the first concept in the one or more first network document concepts;
     obtain, based on the first knowledge gap score and the one or more first network document concepts, one or more additional network documents, the one or more additional network documents include at least the first concept in the one or more first network document concepts; and
     modify, based on the first knowledge gap and based on the one or more additional network documents, the first network document to include at least a portion of the first concept from the one or more additional network documents.

18. The computer program product of claim 17, wherein the program instructions are further configured to:
   obtain, based on the one or more first network document concepts, one or more second additional network documents, the one or more second additional network documents include at least a second concept of the one or more first network document concepts; and
   modify, based on the first knowledge gap and based on the one or more additional network documents, the first network document to include at least a portion of the second concept from the one or more second additional network documents.

19. The computer program product of claim 17, wherein the program instructions are further configured to:
   detect a second user access of the first user, the second user access directed to a second network document;
   determine, based on the second network document, one or more second network document concepts in the second network document;
   identify, based on the second network document and further based on the first user profile, a second knowledge gap of the first user;
   obtain, based on the one or more second network document concepts, one or more second additional network documents, the one or more second additional network documents include at least a second concept of the one or more second network document concepts; and
   modify, based on the second knowledge gap and based on the one or more second additional network documents, the second network document to include at least a portion of the second concept from the one or more second additional network documents.

20. The computer program product of claim 17, wherein the program instructions are further configured to:
   detect a second user access of a second user, the second user access directed to the first network document;
   retrieve, based on the second user access, a second user profile of the second user; and
   identify, based on the first network document concepts and further based on the second user profile, a second knowledge gap of the second user.

* * * * *